Aug. 17, 1965

A. C. WHELCHEL 3,200,778

PLANTER

Filed July 30, 1963

2 Sheets-Sheet 1

INVENTOR
ALVIN C. WHELCHEL

BY

ATTORNEY

Aug. 17, 1965     A. C. WHELCHEL     3,200,778

PLANTER

Filed July 30, 1963     2 Sheets-Sheet 2

INVENTOR
ALVIN C. WHELCHEL

BY

ATTORNEY 3,200,778
PLANTER
Alvin C. Whelchel, 719 19th Ave. E., Cordele, Ga.
Filed July 30, 1963, Ser. No. 298,616
5 Claims. (Cl. 111—85)

This invention relates to apparatus and equipment utilized for cultivating the soil and for the planting of seed which will germinate and grow into food-producing plants, the fruit of which will be used for human consumption.

The invention relates particularly to earth-working apparatus utilized for automatically planting seed at a predetermined depth and at regular intervals in such a manner that the seed will germinate and the resulting plants will have sufficient space to grow and without any waste of available space.

Heretofore planters have been provided for planting seeds in rows. However, these planters usually have been fixed to a propelling vehicle such as a tractor or an earth-working implement in such a manner that the seed planting mechanism was subject to the movement of the tractor or implement and resulted in some of the seed being planted too near to the surface and other seed being planted too deeply and likewise has resulted in the furrow-closing shoes either not closing the furrow sufficiently or, conversely, packing the soil too tightly.

It is an object of the invention to overcome the difficulties enumerated and to provide a multiple row planter including a plurality of units mounted on a cultivator frame or tool bar frame and in which the seed planting device is mounted independently and has means for regulating the depth of the seed, and the furrow-closing and packing wheels likewise are mounted independently so that a constant pressure is applied for closing and packing the soil around the seed.

Another object of the invention is to provide a planter in which the seed planting device and the earth packing device both are mounted independently and the earth packing device is adapted to drive the seed box mechanism.

A further object of the invention is to provide a plurality of planters mounted on a common frame and adapted to be moved by a propelling vehicle and each of such planters is provided with means for planting the seed at a predetermined depth and means for applying a predetermined pressure to close the furrows and pack the soil about the seed.

Figure 1:
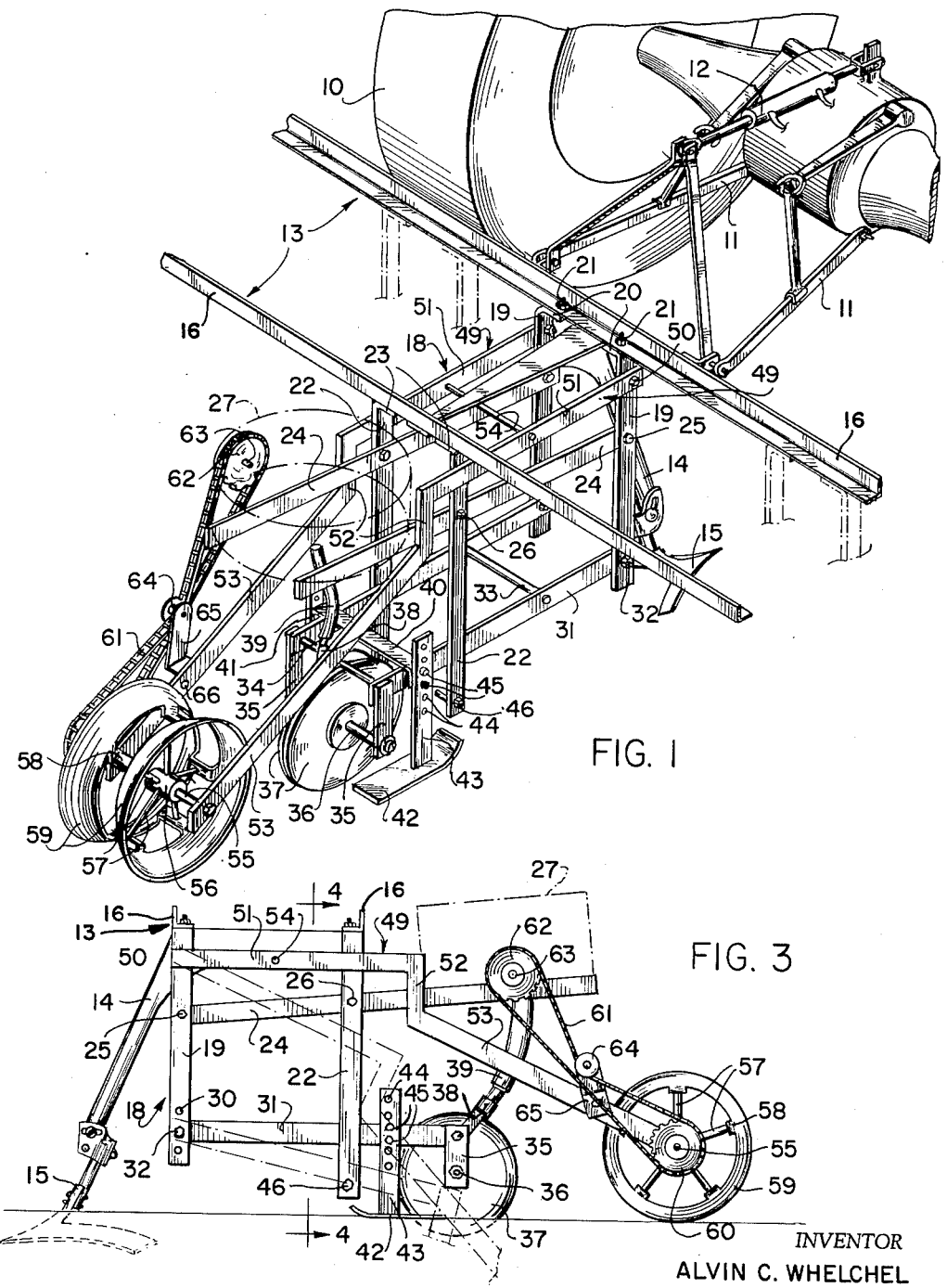
Figure 2:
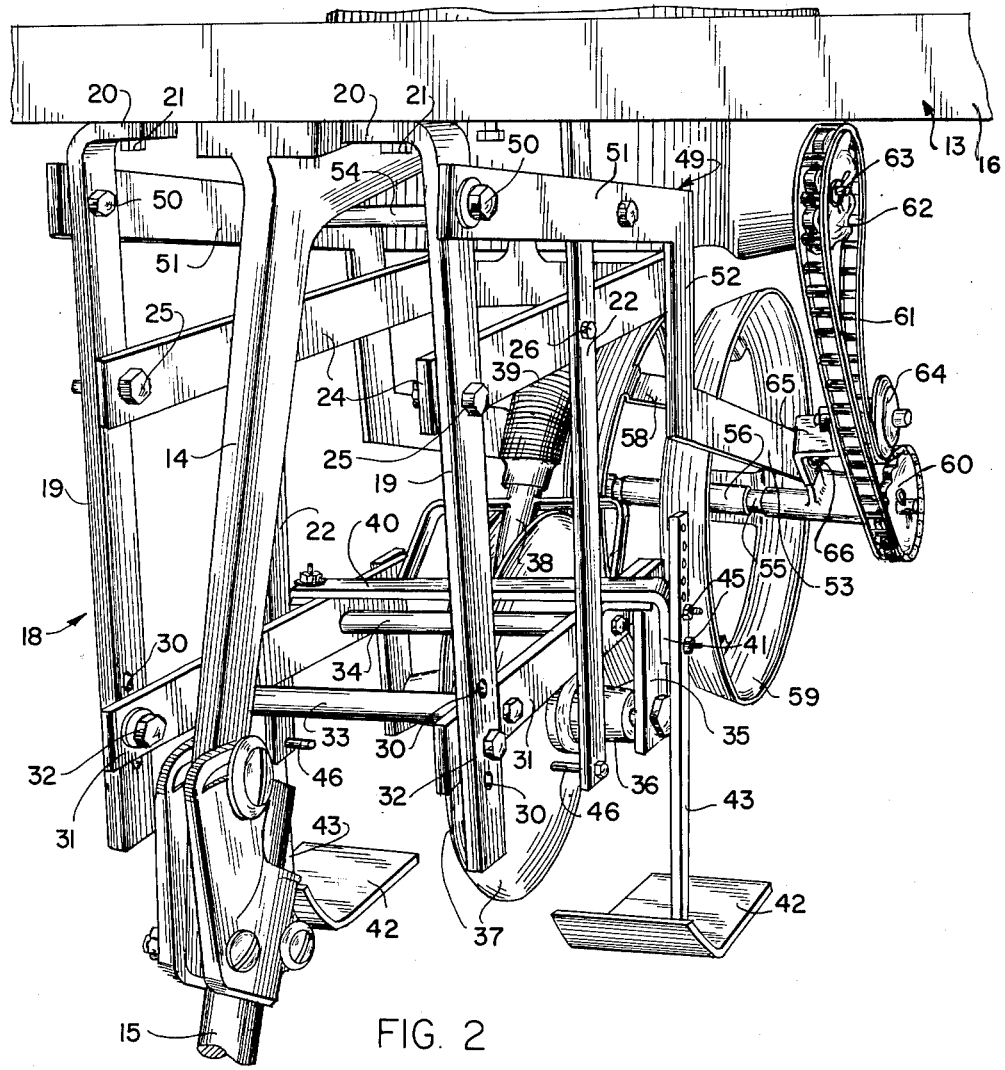
Figure 4:
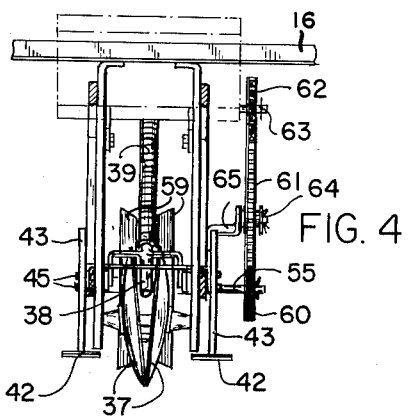

Other objects and advantages of the invention will be apparent from the following description taken in conjunction with the accompanying drawings in which:

FIG. 1 is a rear perspective illustrating one application of the invention;

FIG. 2, an enlarged front perspective thereof;

FIG. 3, a side elevation;

FIG. 4, a section taken along the line 4—4 of FIG. 3; and

Figure 5:
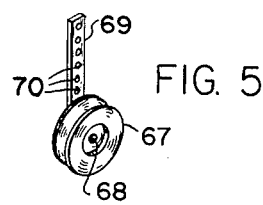

FIG. 5, a perspective of a modified form of depth regulator.

Briefly stated the present invention is a multiple row planter including one or more planter units mounted on an earth-working implement such as a cultivator or the like and each of such units includes a fixed frame connected to the cultivator frame, a seed planter pivotally mounted on the fixed frame and having means for controlling the depth of penetration of the seed planter, a furrow-closing and packing device mounted pivotally on the fixed frame and such device is provided with means for driving the seed box mechanism regardless of the up and down movement of such device.

With continued reference to the drawings a tractor 10 having lift arms 11 and a connection 12 providing a conventional 3-point lift is connected to an earth-working implement such as a cultivator or tool bar having a frame 13. The cultivator frame normally supports earth-working implements such as harrows, spring teeth or the like and in the present instance is illustrated in use with a standard 14 on which a sweep 15 is mounted. The cultivator frame includes a pair of transverse bars or angle members 16 to which the standard 14 is attached.

A planter frame 18 includes a pair of depending front legs 19 having flanges 20 at their upper portions by which such legs are attached to the cultivator frame 13 by fasteners 21. A pair of rear legs 22 having flanges 23 likewise are fastened to the cultivator frame 13 by fasteners 21. A pair of arms 24, one at each side of the planter frame, are provided and one end of each of the arms is connected to one of the front legs 19 by bolts 25 or other fastening means and attached to the rear legs 22 by bolts 26 or other fasteners. The arms 24 extend rearwardly of the rear legs 22 a substantial distance and are adapted to support a seed box 27 of conventional construction.

The lower portion of each of the front legs 19 is provided with a series of openings 30 so that a pair of rearwardly extending bars 31 may be adjustably connected to the front legs 19 by pivots 32. The bars 31 are maintained in spaced relation to each other by an intermediate spacer 33 and a spacer 34 at the free ends of such bars. A depending bracket 35 is attached to the free end of each of the bars 31 and such brackets receive a shaft or axle 36 on which a pair of angularly disposed seeder plates 37 are rotatably mounted.

The plates 37 are arranged in such a manner that the lower portions of the plates are substantially in engagement while the upper portions of the plates are in spaced relation to each other. A nozzle 38 is disposed between the spaced upper portions of the plates 37 and such nozzle is connected by a flexible connecting line 39 to the seed box 27 so that the seed from the seed box are deposited between the plates and when the plates are rotated such plates will form a furrow and the seed will be deposited therein. The bars 31 are pivotally connected to the front legs 19 and the seeder plates are adapted to penetrate the earth by their own weight for a predetermined distance. In order to control the depth of penetration of the plates 37, a spacer bar 40 is mounted on the bars 31 adjacent the free ends thereof and extends outwardly of each side of the bars 31 and terminates in a downwardly extending portion 41.

As illustrated in FIGS 1–4 a depth regulating skid 42, having an upwardly extending lug 43 with a series of openings 44 therein, is adjustably connected to the downwardly extending portions 41 by fasteners 45. The rear legs 22 extend downwardly to a position below the bars 31 and are provided with inwardly extending pins 46 which engage the bars 31 when the implement is lifted out of engagement with the earth and such pins limit the downward movement of the bars and the seeder plates 37.

A pair of rearwardly and downwardly extending arms 49 are pivotally connected to the front legs 19 by pivots 50 at the upper portions of such legs with one arm being attached to each leg. Each of the arms 49 has a generally horizontal portion 51, a generally vertical portion 52 and a downwardly and rearwardly angularly disposed portion 53. The generally horizontal portions 51 are connected by a spacer 54 adapted to engage the arms 24 when the implement is raised out of engagement with the ground to limit the pivotal movement of the arms 49.

An axle 55 is mounted rotatably on the free ends of the angularly disposed portions 53 and such axle supports a hub 56 fixed thereon and from which a plurality of spokes 57 radiate. The outer ends of the spokes are secured to cross members 58 which connect a pair of generally frusto-conical wheels 59 spaced relatively close together and adapted to close the furrow and pack the soil about the seed that has been deposited therein by the seeder plates 37. The arms 49 are freely rotatable about the pivots 50 when the device is in use so that the weight of the combined arms and wheels is the determining factor as to the amount of packing of the soil. If desired one or more weights (not shown) may be added to the arms 49 to increase the packing action of the frusto-conical wheels.

The axle 55 extends through one of the arms 49 and a drive sprocket 60 is mounted on the free end of such axle and is adapted to be rotated by the wheels 59. The sprocket 60 is connected by a chain 61 to a driven sprocket 62 mounted on an axle 63 which extends into the seed box 27 to cause agitation of the seed therein and to feed such seed through the flexible line 39 and the nozzle 38 into the seeder plates 37. Since the arms 49 are pivotally mounted, the slack in the chain 61 will vary with the position of the wheels 59 and such slack will be taken up by an idler wheel 64 carried by a bracket 65 which in turn is mounted pivotally by a pin 66 to the angularly disposed portion 53 of one of the arms 49.

With reference to FIG. 5 a modified form of depth regulating tool is illustrated and includes a relatively wide ground-engaging wheel 67 rotatably mounted on an axle 68 which in turn is mounted on a lug 69 having a plurality of openings 70 therein. The lug 69 may be adjustably connected to the downwardly extending portions 41 of the spacer bar 40 by fasteners 45.

In the operation of the device a planter frame 18 is connected to the cultivator frame 13 on both sides of the standard 14 of an earth-working implement such as the sweep 15. When the cultivator frame is moved through a field the sweep will penetrate the earth and loosen and aerate the soil. As the cultivator frame travels over the field the skids 42 will follow the contour of the earth and permit the seeder seeder plates 37 to penetrate to a predetermined distance, open a furrow and deposit seed therein. Simultaneously, the frusto-conical wheels 59 which likewise are freely floatable when in use will close the furrow and pack the soil about the seed.

It is noted that a plurality of planter frames can be mounted on the cultivator frames to plant multiple rows simultaneously.

It will be apparent from the foregoing that a relatively simple multiple row planter has been provided with an independently mounted planting device adapted to plant seed at a predetermined depth and independently mounted furrow-closing and soil-packing wheels will apply a predetermined pressure for packing the soil about the seed.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A seed planter for mounting on the frame of an earth-working implement, said planter including a first pair of legs fixed to said implement frame, a second pair of legs fixed to said implement frame, an arm connected to said first and second legs at each side of said planter and extending rearwardly thereof, a rearwardly extending bar pivotally connected to the lower portion of each of said first legs, means for maintaining said bars in spaced relation, an axle rotatably mounted on the free ends of said bars, seed planting means carried by said axle, a spacer mounted adjacent to the free ends of said bars, and terminating in a downwardly extending portion at each side, a depth regulating skid adjustably mounted on each of said downwardly extending portions, means on said second pair of legs for limiting the downward movement of said bars, a second pair of arms, one of said second arms pivotally attached to each of said first pair of legs, means on said second pair of arms for limiting the downward movement of said second pair of arms, an axle rotatably mounted on the free ends of second pair of arms, a pair of generally frusto-conical wheels fixed on said axle, a sprocket carried by said axle, a seed box fixed to the rearwardly extending portion of said first pair of arms, an axle extending outwardly of said seed box, a second sprocket mounted on said seed box axle, and chain means connecting said first and second sprockets, whereby said seed planting means will be independently pivotally mounted on said first pair of legs and said frusto-conical wheels will be pivotally mounted on said first pair of legs and adapted to drive said seed box.

2. In combination, a seed planter unit for mounting on an earth-working implement of a vehicle including a tool bar frame means, earth-working means mounted on and depending from said bar frame means to loosen and aerate the soil, said planter unit being mounted on said tool bar frame means independently of said earth-working means and comprising a frame structure, said frame structure including substantially vertically extending pairs of fore and aft spaced leg members disposed rearwardly of said earth-working means, a pair of bar members extending rearwardly of said frame structure and pivotally connected at one end thereof to a lower portion of said fore leg members, a plurality of obliquely disposed seeder members rotatably mounted about a common axis on the free ends of said bar members rearwardly of said frame structure, adjustable depth regulating means fixedly attached to said pair of bar members adjacent said seeder members, a first pair of arms pivotally connected at one end to an upper portion of said fore legs of said frame structure and extending rearwardly of said rotatable seeder members, shaft means rotatably mounting a pair of ground-engaging and furrow-closing presser wheels in axially spaced alignment on the opposite ends of said first pair of arms, a second pair of arms rigidly secured to said front and rear legs of said frame structure intermediate said bar members and said first pair of arms, and extending rearwardly of said frame structure, seed-holding means having a rotatable agitator shaft member therein fixedly mounted on said second pair of arms and positioned rearwardly of said frame structure, means for conveying seeds from said seed-holding means to a point adjacent said pair of rotatable seeder members, and flexible drive means extending between said shaft means of said ground-engaging presser wheels and said rotatable agitator shaft member of said seed-holding means to effect delivery of seeds to said rotatable seeder members.

3. The structure of claim 2 including means on said first pair of arms engageable with said second pair of arms for limiting downward movement of said ground-engaging presser wheels, and adjusting means for said flexible drive means carried by said first pair of arms and operative to compensate for slack in said drive means due to relative vertical movement of said frusto-conical wheels.

4. In combination, a seed planter unit for mounting on an earth-working implement of a vehicle including a tool bar frame means, earth-working means mounted on and depending from said tool bar frame means to loosen and aerate the soil, said planter unit being independently mounted on said tool bar frame means and comprising a frame structure, said frame structure including substantially vertically extending pairs of fore and aft spaced leg members, a pair of bar members extending rearwardly of said frame structure and pivotally connected at their leading ends to said fore leg members, shaft means carried by and connecting the trailing ends of said pair of bar members, seed planting means mounted on said shaft means rearwardly of said frame structure, adjustable depth regulating skid means fixedly attached to said pivoted pair of bar members adjacent said seeder members, a first pair of arms pivotally connected at their leading ends to said fore leg members and extending rearwardly and over said seed planting means, means rotatably mounting a pair of ground-engaging furrow-closing wheels in axially spaced alignment on the trailing ends of said first pair of arms, a second pair of arms rigidly secured to said fore and aft leg members and extending rearwardly thereof, seed-holding means including a rotatable agitator extending therefrom fixedly mounted on said second pair of arms and positioned thereon rearwardly of said frame structure, means for conveying seeds from said seed-holding means to said seed-planting means, and drive means actuated by said ground-engaging furrow-closing wheels for rotating said agitator of said seed-holding means.

5. The structure of claim 4 including means on said frame structure to engage and limit movement of said furrow-closing wheels in one direction, and said seed-planting means comprising a pair of angularly disposed seeder plates.

References Cited by the Examiner
UNITED STATES PATENTS

| | | | |
|---|---|---|---|
| 648,954 | 5/00 | Haworth | 111—66 |
| 858,201 | 6/07 | McCoy | 111—60 |
| 2,416,189 | 2/47 | McIntyre | 111—85 |
| 3,076,511 | 2/63 | Johnson | 111—69 X |

ABRAHAM G. STONE, *Primary Examiner.*

T. GRAHAM CRAVER, *Examiner.*